(12) United States Patent
Kim et al.

(10) Patent No.: US 7,319,665 B2
(45) Date of Patent: Jan. 15, 2008

(54) METHOD FOR DETECTING PROBLEMS IN ROUTING PROTOCOL MODULES OF DISTRIBUTED ROUTER

(75) Inventors: Byoung-Chul Kim, Yongin-shi (KR); Yeong-Seop Han, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 995 days.

(21) Appl. No.: 10/400,458

(22) Filed: Mar. 28, 2003

(65) Prior Publication Data

US 2003/0198221 A1   Oct. 23, 2003

(30) Foreign Application Priority Data

Apr. 18, 2002   (KR) .............................. 2002-21214

(51) Int. Cl.
*H04L 12/28* (2006.01)
(52) U.S. Cl. ................. 370/218; 370/242; 370/312
(58) Field of Classification Search ............ 370/218, 370/242, 312

See application file for complete search history.

(56) References Cited

U.S. PATENT DOCUMENTS

| | | | |
|---|---|---|---|
| 5,790,541 A | 8/1998 | Patrick et al. | |
| 5,802,278 A | 9/1998 | Isfeld et al. | |
| 5,963,745 A | 10/1999 | Collins et al. | |
| 6,049,524 A * | 4/2000 | Fukushima et al. | 370/220 |
| 6,226,644 B1 | 5/2001 | Ciscon et al. | |
| 6,335,926 B1 | 1/2002 | Silton et al. | |
| 6,577,634 B1 * | 6/2003 | Tsukakoshi et al. | 370/395.31 |
| 6,580,715 B1 * | 6/2003 | Bare | 370/396 |
| 6,590,868 B2 * | 7/2003 | Shen | 370/242 |
| 6,850,486 B2 * | 2/2005 | Saleh et al. | 370/218 |
| 7,065,059 B1 * | 6/2006 | Zinin | 370/312 |

* cited by examiner

*Primary Examiner*—Edan Orgad
*Assistant Examiner*—Jay P. Patel
(74) *Attorney, Agent, or Firm*—Robert E. Bushnell, Esq.

(57) ABSTRACT

Disclosed is a method for checking for errors and problems in routing protocol modules through hello packet transmission in a distributed router that is mounted with a network processor, a system processor, a routing protocol module, and a switch module including at least two input/output processors which can be operated together with independent routers, a system processor, and a designate routing protocol module. The method including the steps of: checking hello packet transmission cycle; if the hello packet transmission cycle has expired, transmitting a hello packet to the adjacent routing protocol module; receiving a hello response packet from the adjacent routing module; if the adjacent routing protocol module does not send the hello response packet, concluding that the adjacent routing is malfunctioning; and transmitting information on the malfunctioning adjacent routing protocol module to the designate routing protocol module.

24 Claims, 5 Drawing Sheets

METHOD FOR DETECTING PROBLEMS IN ROUTING PROTOCOL MODULES OF DISTRIBUTED ROUTER

CLAIM OF PRIORITY

This application claims priority to an application entitled "Method for checking bugs in routing protocol module of distributed router" filed in the Korean Industrial Property Office on Apr. 18, 2002, and assigned Serial No. 02-21214, the contents of which are hereby incorporated by reference.

BACKGROUND OF THE INVENTION

1. Technical Field

The present invention relates generally to distributed routers, and more particularly, to a method for checking for errors and problems in routing protocol modules of a distributed router.

2. Related Art

A router is a data switch for processing connections among diverse networks. In general, the router identifies the address of data that goes through the switch, determines a transmission path for the data, and collects packet data to be transmitted to a destination. Particularly, a routing protocol is used for the router, and some routing protocols include interior gateway protocol (IGP), routing information protocol (RIP), open shortest path first (OSPF) and others.

Previously, the router calculated a routing table by implementing a routing protocol through the central processor, and distributed the routing table to each line card. In other words, packet forwarding was possible by routing table information that is provided by the central processor. This trend was changed when a distributed router was introduced. The distributed router had a different processor to take care of control and packet forwarding. Naturally, the router's performance was greatly improved and was able to process a large volume of data.

There can be an undesirable amount of overhead required of the distributed router during a detection of problems. It would be desirable to develop an improved method for detecting problems in routing protocol modules of a distributed router which will minimize or reduce the overhead needed for the detection of the problems.

SUMMARY OF THE INVENTION

The present invention provides a method for detecting errors and problems in routing protocol modules for the purpose of reducing overhead thereon.

The present invention provides a method for reducing overhead of routing protocol module of switch module by distributing checking procedure to find out whether input/output processors that operate through router are being normally operated.

The present invention provides method for checking for errors and problems in routing protocol modules through hello packet transmission in a distributed router that is mounted with a network processor, a system processor, a routing protocol module, and a switch module including at least two input/output processors which can be operated together with independent routers, a system processor, and a designate routing protocol module, the method including the steps of: checking hello packet transmission cycle; if the hello packet transmission cycle has expired, transmitting a hello packet to the adjacent routing protocol module; receiving a hello response packet from the adjacent routing module; if the adjacent routing protocol module does not send the hello response packet, concluding that the adjacent routing protocol module has errors or problems; and transmitting information on the malfunctioning adjacent routing protocol module to the designate routing protocol module.

In accordance with the principles of the present invention, as embodied and broadly described, the present invention provides a method, comprising: detecting routing protocol modules that are not functioning normally in a distributed router, the distributed router including at least a first switch module having a first designate routing protocol, a first input/output processor having a first routing protocol module, and a second input/output processor having a second routing protocol module, said detecting comprising: determining when a transmission cycle expires; when the transmission cycle expires, transmitting a first hello packet from the first routing protocol module to the second routing protocol module; when the second routing protocol module is functioning normally, sending a first hello response packet from the second routing protocol module to the first routing protocol module in response to the first hello packet; and when the second routing protocol module does not send the first hello response packet to the first routing protocol module in response to the first hello packet, determining that the second routing protocol module is not functioning normally and transmitting information to the first designate routing protocol module, the information indicating that the second routing protocol module is not functioning normally.

In accordance with the principles of the present invention, as embodied and broadly described, the present invention provides a method for detecting a module that is not functioning normally in a router, comprising: in a router including at least a first input/output processor having a first routing protocol module and including a second input/output processor having a second routing protocol module, determining when a transmission cycle expires; when the transmission cycle expires, transmitting a first hello packet to the second routing protocol module; when the second routing protocol module is functioning normally, sending a first hello response packet from the second routing protocol module in response to the first hello packet; and when the second routing protocol module does not send the first hello response packet in response to the first hello packet, determining that the second routing protocol module is not functioning normally and transmitting information indicating that the second routing protocol module is not functioning normally.

In accordance with the principles of the present invention, as embodied and broadly described, the present invention provides a method for detecting when a routing protocol module in a router is not functioning normally, the method comprising: detecting when a routing protocol module is not functioning normally in a distributed router, said detecting being performed through hello packet transmission in the distributed router, the distributed router including at least two switch modules, a first input/output processor having a first routing protocol module, and a second input/output processor having a second routing protocol module, each of the two switch modules including a designate routing protocol, said detecting comprising: monitoring a timer to determine when a hello packet transmission cycle expires; when the hello packet transmission cycle expires, transmitting a hello packet to the second routing protocol module from the first routing protocol module; when the second routing protocol module is functioning normally, sending a first hello response packet from the second routing protocol module to the first routing protocol module in response to the first hello packet; and when the second routing protocol module does not send the first hello response packet in response to the first hello packet within a predetermined period of time, determining that the second routing protocol module is not functioning normally and transmitting information from the first routing protocol module to the designate routing protocol of at least one of the two switch modules, the information indicating that the second routing protocol module is not functioning normally.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
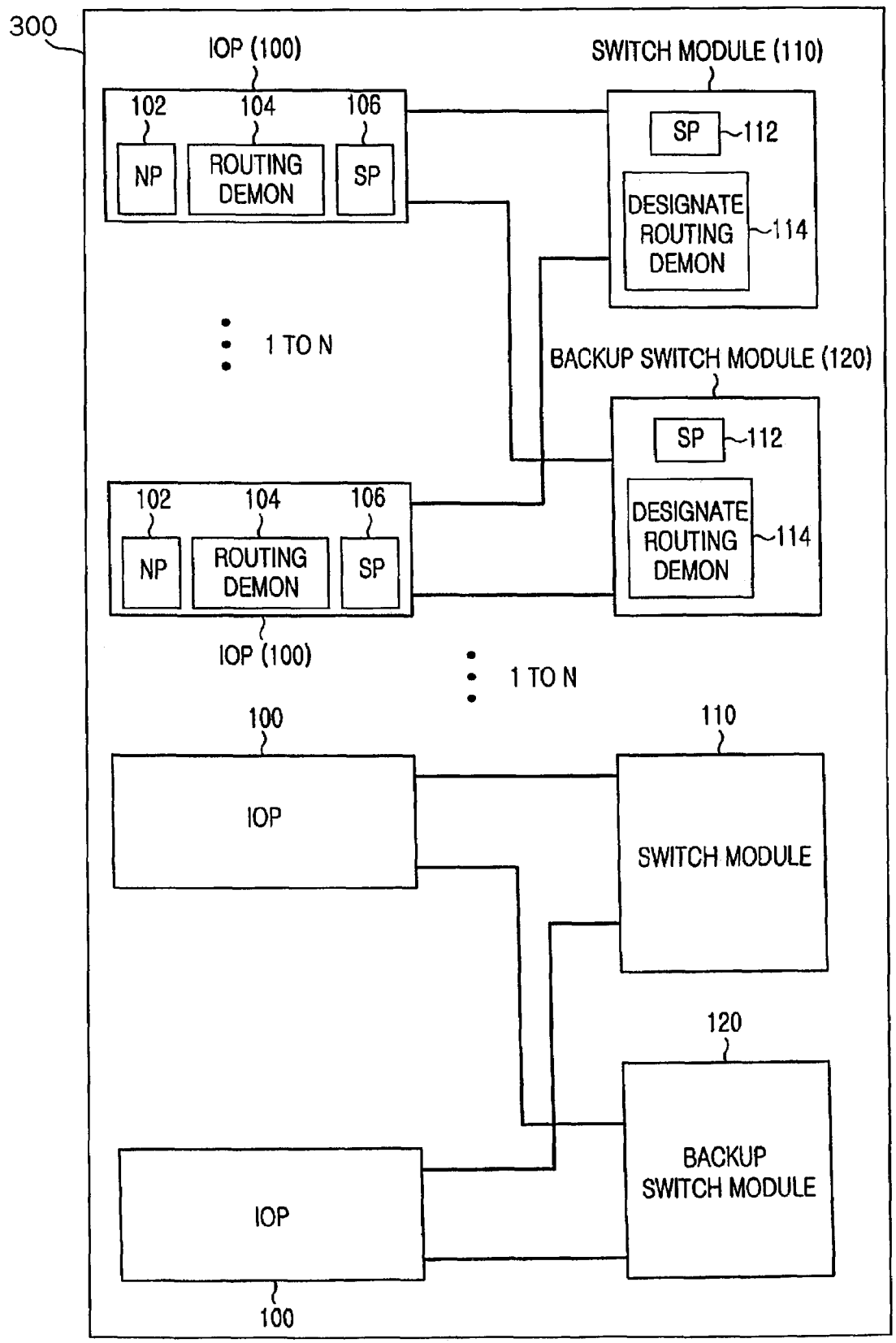
FIG. 1 is a block diagram illustrating structure of a distributed router.

FIG. 1 is a block diagram illustrating structure of a distributed router. The distributed router 300 includes a plurality of input/output processors (IOP) 100. Each input/output processor (IOP) 100 controls and directs data input and output. The input/output processor 100 makes sure that the central processor is not involved in input/output operations, and as a result thereof, processing time and loading can be reduced. Each input/output processor 100 performs packet forwarding through NP (hereinafter referred to as Network Processor). Also, each input/output processor 100 processes data in general including routing information and control data through system processor (SP) and then manages a routing table. Each input/output processor 100 acts as an independent router. As described above, as each input/output processor 100 acts as a router and manages a routing table, a routing protocol module 104 is required for synchronizing the input/output processor 100. For example, the designate routing protocol 114 in the switch module 110 (SWM) 110 depicted in FIG. 1 is used as the routing protocol module for synchronizing the input/output processors 100. The designate routing protocol 114 is also referred to as a designate routing demon 114.

The designate routing protocol 114 in the switch module 110 supports redundancy in the distributed router, and monitors whether the routing protocol module 104 of each input/output processor 100 is properly operating. Typically, a hello packet is used on the regular basis for determining whether the routing protocol module 104 is operating properly.

Cyclic checking needs to be done every several milliseconds for the designate routing protocol 114 in the switch module 110 of the distributed router shown in FIG. 1 to be able to transmit hello packets to the routing protocol module 104 of a plurality of input/output processors 100 and manage those hello packets. The designate routing protocol 114 in the switch module 110 transmits a hello packet to every routing protocol module 104 in conforming to the checking cycle. The transmission of the hello packet is realized by broadcasting the hello packet to the plurality of routing protocol modules. The designate routing protocol 104, in response to the transmitted hello packet, checks to determine whether other routing protocol modules 104 are being properly operated. The designate routing protocol 104 performs the checking by using a hello response packet transmitted by the other routing protocol modules 104.

The backup switch module 120 in FIG. 1, as the name indicates, is for backing up the switch module 110 when the switch module 110 is malfunctioning or experiencing problems due to errors. The switch module 110 and the backup switch module 120 check each other at any time to determine whether there are any problems.

Figure 2:
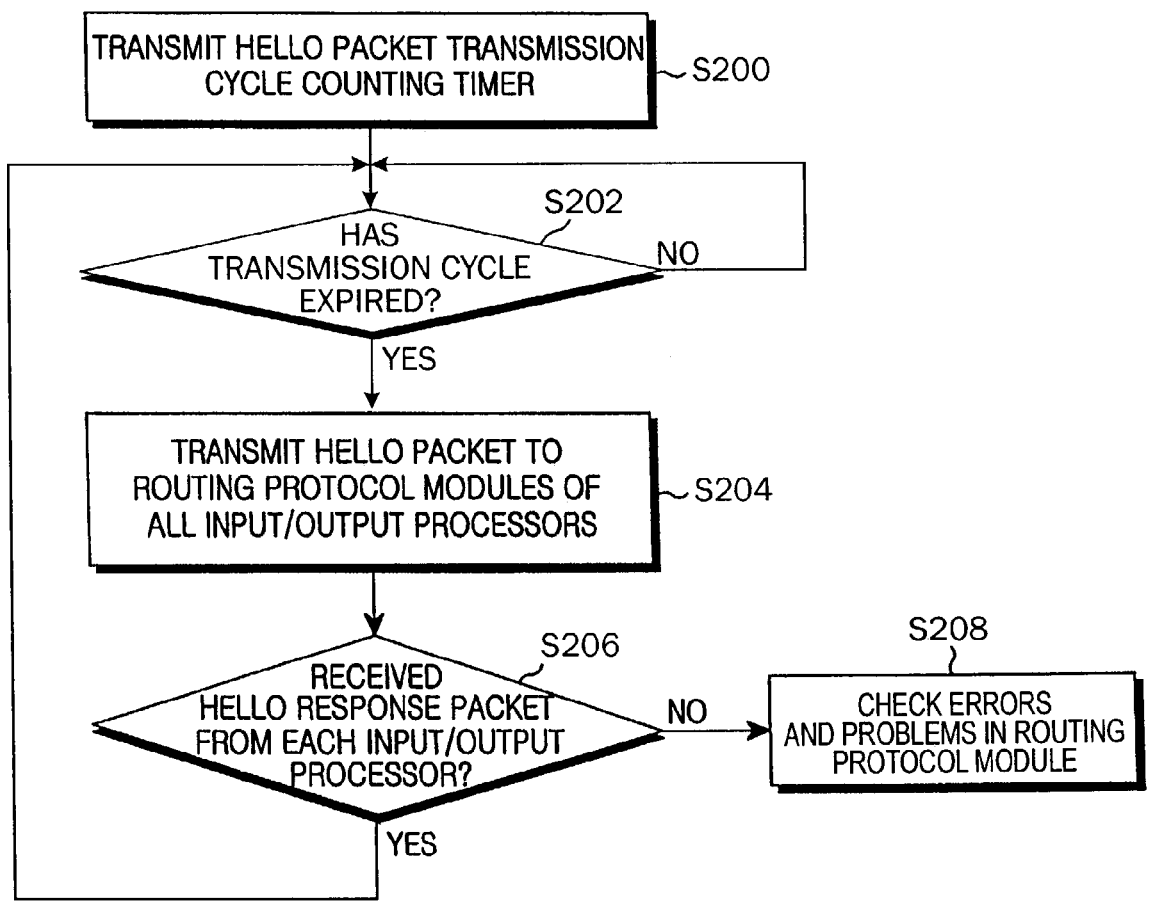
FIG. 2 diagrammatically depicts a procedure for checking for errors and problems in a routing protocol module.

FIG. 2 diagrammatically depicts a procedure for checking for errors and problems in a routing protocol module. FIG. 2 illustrates a procedure used to check whether the routing protocol module 104 is being properly operated. This repeated checking might be a undesirable burden. This checking might become an excessive overhead to the designate routing protocol 114 of the switch module 110. Therefore, a new method for decreasing overhead of the designate routing protocol 114 of the switch module 110 is required. The present invention provides the new method for decreasing overhead of the designate routing protocol 114 of the switch module 110.

Exemplars of recent efforts related to improving network connections or improving routers include the five following references: U.S. Pat. No. 6,335,926 to Silton et al., entitled DYNAMIC CONFIGURATION OF EDGE FORWARDERS TO ROUTE SERVERS IN A DISTRIBUTED ROUTER SYSTEM, issued on Jan. 1, 2002, U.S. Pat. No. 6,226,644 to Ciscon et al., entitled METHOD, STORAGE MEDIUM AND SYSTEM FOR DISTRIBUTING DATA BETWEEN COMPUTERS CONNECTED TO A NETWORK, issued on May 1, 2001, U.S. Pat. No. 5,963,745 to Collins et al., entitled APAP I/O PROGRAMMABLE ROUTER, issued on Oct. 5, 1999, U.S. Pat. No. 5,790,541 to Patrick et al., entitled APPARATUS, METHOD, SYSTEM AND SYSTEM METHOD FOR DISTRIBUTED ROUTING IN A MULTIPOINT COMMUNICATION SYSTEM, issued on Aug. 4, 1998, and U.S. Pat. No. 5,802,278 to Isfeld et al., entitled BRIDGE/ROUTER ARCHITECTURE FOR HIGH PERFORMANCE SCALABLE NETWORKING, issued on Sep. 1, 1998.

While these recent efforts provide advantages, I note that they fail to adequately provide a method for efficiently and conveniently detecting problems in routing protocol modules of a distributed router.

The input/output processor 100 shown in FIG. 1 performs packet forwarding through network processor (NP) 102, and manages routing table through system processor (SP) 106. The system processor 106 processes data in general including routing information and every kind of control data, and manages the routing table. The routing table is where the information on router is stored. Generally, the routing table is used for managing the router, and is stored in a storage device (not shown) mounted in the input/output processor 100.

Particularly, a routing protocol module in switch module 110 has been designated as "designate routing protocol module" because it acts as designate (or representative) routing protocol in the present embodiment of the invention. In fact, the designate routing protocol module is one of the roles given to the routing protocol module by a hello packet. For example, in case of Ethernet, namely a multi-access network to which several routers are accessed, one designated routing protocol module is selected by using hello packet. Therefore, as the designate routing protocol module collects link information or performs distribution for other routers, it becomes possible to reduce routing protocol's traffic or topology database. Here, the hello packet is primarily used to establish and maintain a close relationship among open shortest path first (OSPF). Backup designate routing protocol module 114 (in backup switch module 120) is for backing up the designate routing protocol 114 in switch module 110, particularly when the designate routing protocol 114 in switch module 110 has defects therein.

The present invention is directed to a method for decreasing a load on the designate routing protocol 114 of the switch module 110 during a process of checking for errors and problems in the routing protocol module 104 in each input/output processor 100 for a distributed router, in which an input/output processor 100 acts as an independent router. The designate routing protocol 114 of the switch module 110 applies a hello packet process performed by each router for use of routing protocol to distribution structure, and performs distribution process to the routing protocol module 104 of the adjacent input/output processor 100. In doing so, the designate routing protocol 114 of the switch module can successfully decrease a load that is generated during hello packet process for routing protocol module 104 of each input/output processor 100 and designate routing protocol 114 of other switch modules 110.

Figure 3:
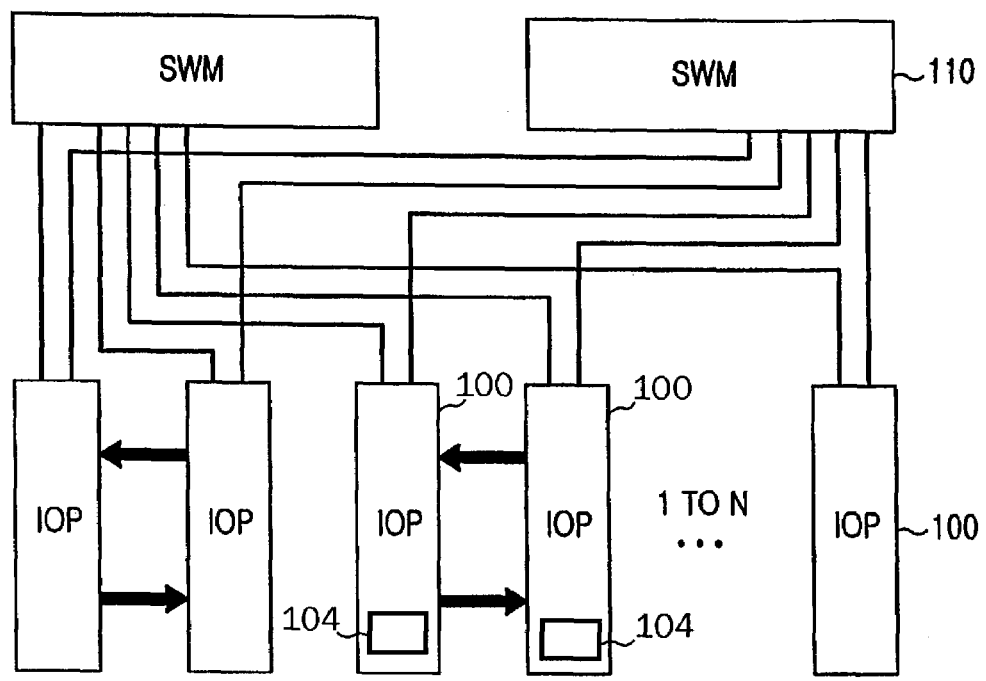
FIG. 3 diagrammatically depicts a first embodiment of a method for designating a neighbor of a routing protocol module, in accordance with the principles of the present invention.

FIG. 3 diagrammatically depicts a first embodiment of a method for designating a neighbor of a routing protocol module, in accordance with the principles of the present invention. Designating a neighbor of the routing protocol module 104 means designating another routing protocol module 104 for transceiving a hello packet for an arbitrary routing protocol module 104. Typically, the task is done between routing protocol modules 104 of adjacent input/output processors 100. That is, two adjacent routing protocol modules 104 as shown in FIG. 3 can be designated as neighbors. The routing protocol modules 104 check for errors and problems in the designated neighbor by checking each other's routing protocol module 104 through transceiving hello packets and hello response packets between each other, and sending the result thereof to the designate routing protocol 114 of the switch module 110. The arrows shown in FIG. 3 indicate the paths of the transmitted hello packets and the transmitted hello response packets. There is a potential disadvantage with paring two neighboring routing protocol modules 104 and designating each as neighbor for each other as shown in FIG. 3. If those two routing protocols have similar defects at the same time, they might not be able to recognize that they are both malfunctioning at the same time. To prevent any disadvantage of the configuration shown in FIG. 3, designating neighbors of routing protocol modules 104 can be done in a different way.

Figure 4:
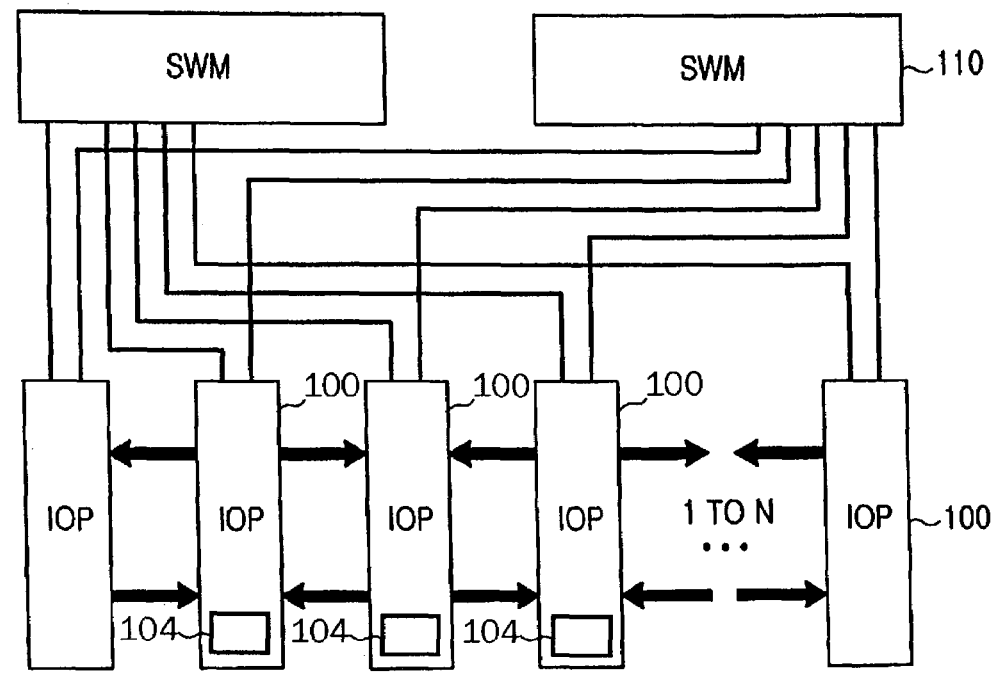
FIG. 4 diagrammatically depicts a second embodiment of a method for designating a neighbor of a routing protocol module, in accordance with the principles of the present invention.

FIG. 4 diagrammatically depicts a second embodiment of a method for designating a neighbor of a routing protocol module, in accordance with the principles of the present invention. With reference to FIG. 4, to improve reliability of detecting errors and problems in the routing protocol modules 104, the routing protocol modules 104 of adjacent input/output processors 100 are serially connected to designated neighbors. A routing protocol module 104 is not designated as a neighbor for another routing protocol module 104, but is designated as a neighbor for two routing protocol modules 104. In doing so, it is possible to detect errors and problems in the routing protocol module 104 even if more than two routing protocol modules 104 could be malfunctioning at the same time. The arrows shown in FIG. 4 indicate the paths of the transmitted hello packets and the transmitted hello response packets. A router administrator determines whether the hello packet would be exchanged with a single neighbor as shown in FIG. 3, or with both neighbors as shown in FIG. 4. The neighbor relationship is designated by a designate routing protocol module 114 of a switch module 110 which manages information of input/output processor (IOP) 100.

Besides the embodiments presented in FIG. 3 and FIG. 4, designating neighbor can be done for some number of routing protocol modules 104, such as three or four, or more. Deciding which embodiment would be appropriate for designating neighbors is dependent on the reliability required of different systems.

Figure 5:
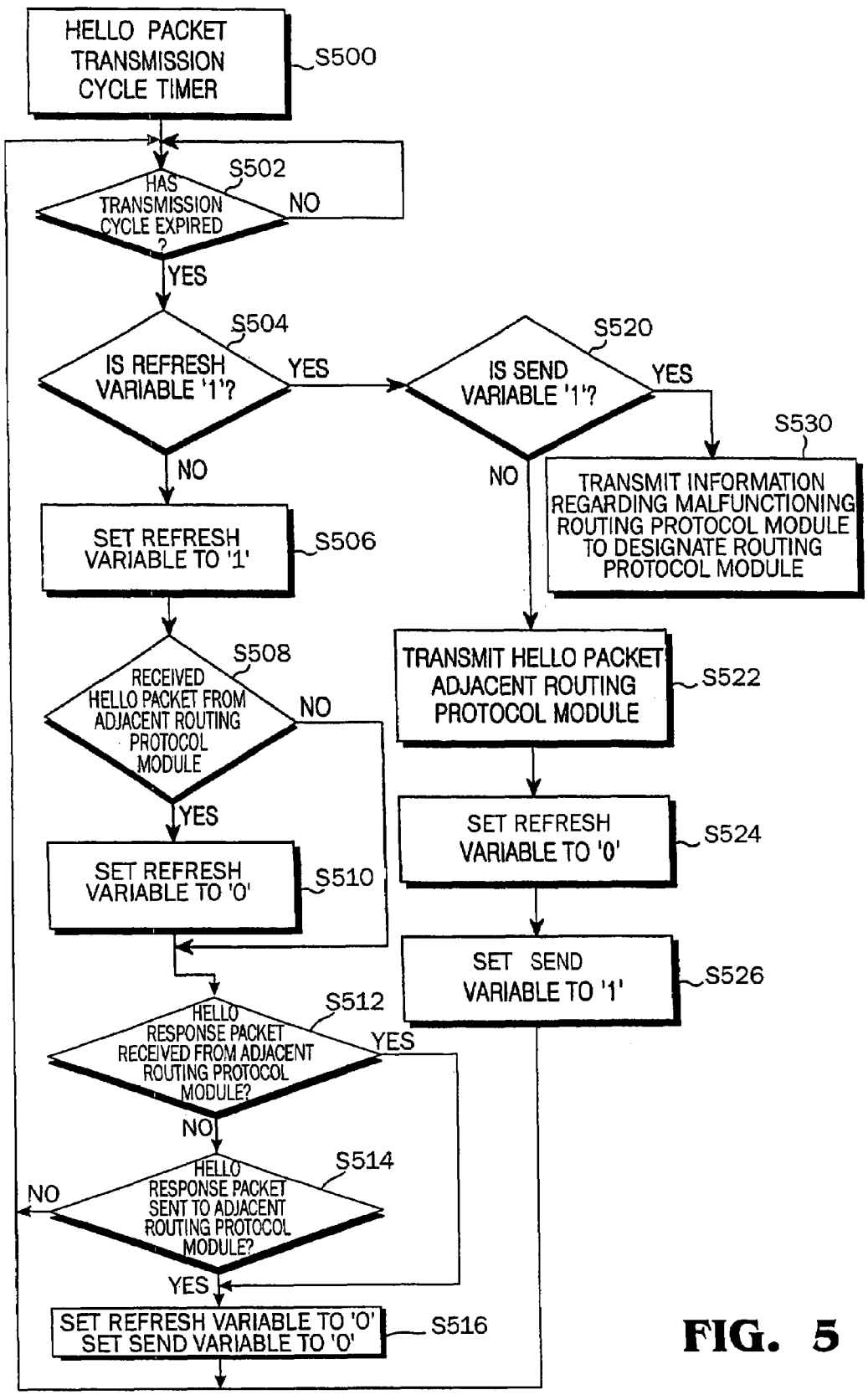
FIG. 5 diagrammatically depicts a procedure for checking for errors and problems in a routing protocol module of a distributed router, in accordance with the principles of the present invention.

FIG. 5 diagrammatically depicts a procedure for checking for errors and problems in a routing protocol module of a distributed router, in accordance with the principles of the present invention. What the drawing shows is the improved operating procedure for reducing a packet transmission rating and reducing an overhead to a level suitable for a distributed router. More details on the procedure will now be provided with reference to FIG. 1 and FIGS. 3 through 5. While the invention has been described in conjunction with various embodiments, they are illustrative only. Therefore, the present invention is not limited to those embodiments.

To realize the present invention, routing protocol module 104 of input/output processor 100 and designate routing protocol 114 of the switch module 110 set up a neighbor relationship for exchanging hello packets before the operation of router according to the setting up by a user. To realize the present invention, each input/output processor 100 of the distributed router, and routing protocol module 104 and designate routing protocol 114 of the switch module 110 designate adjacent routing protocol module 104, namely neighboring routing protocol module 104, to enable each routing protocol module 104 to transmit a hello packet, for example, by designating user before the router starts operation.

With reference to FIG. 5, the first step shown is step S500. As will be clear as a result of the description of the steps shown in FIG. 5, a hello packet is not sent at step S500. Instead, a hello packet is not sent until step S522 is performed. A number of steps are performed prior to step S522. After the hello packet is transmitted in step S522, a hello response packet can be received.

At step S500, every routing protocol module 104 sets a timer to count a transmission cycle of a hello packet. The transmission cycle of the hello packet is usually in the range of several tens of seconds, but it may be optionally set differently, depending on characteristic and requirement of a system.

At step S502, a check is made to determine if the transmission cycle for the hello packet has expired, depending on the count of the timer. At step S502, if the transmission cycle has not expired, counting continues. At step S502, if the transmission cycle has expired, then step S504 is performed. At step S504, routing protocol module 104 checks a variable called "refresh". At step S504, if the refresh variable is "1", then step S520 is performed next. At step S504, if the refresh variable is not "1", then step S506 is performed next.

At step S504, the refresh variable is used to help decide whether it is necessary for an arbitrary routing protocol module 104 to transmit a hello packet to an adjacent routing protocol module 104. The adjacent routing protocol module 104 is a routing protocol module 104 that is adjacent to the arbitrary routing protocol module 104. In order to enhance the clarity of the description of the present invention with reference to FIG. 5, the aforementioned "arbitrary routing protocol module 104" shall be referred to as a first routing protocol module 104. The aforementioned "adjacent routing protocol module 104" shall be referred to as a second routing protocol module 104. The first and second routing protocol modules 104 are in a distributed router.

At step S504, when the refresh variable is not "1" then step S506 is performed after step S504. At step S506, the refresh variable is set to "1".

At step S508, a determination is made regarding hello packets. At step S508, a determination is made to see whether the first routing protocol module 104 has received a hello packet from the second routing protocol module 104. That is, at step S508, a determination is made to see whether the arbitrary routing protocol module 104 has received a hello packet from the adjacent routing protocol module 104. At step S508, a determination is made to see whether a hello packet is transmitted from the second routing protocol module 104 to the first routing protocol module 104 prior to the beginning of the next transmission cycle.

At step S508, if the first routing protocol module 104 has not yet received a hello packet, then step S512 is performed next. At step S508, if the first routing protocol module 104 has already received a hello packet, then step S510 is performed next. At step S510, when the first routing protocol module 104 has received a hello packet from the second routing protocol module 104, then the refresh variable is set to "0". When the first routing protocol module 104 has received a hello packet from the second routing protocol module 104, this is an indication that the second routing protocol module 104 is probably operating normally.

The refresh variable is set to "0" at step S510 to indicate that the second routing protocol module 104 that sent the hello packet is operating normally. In other words, in case that the second routing protocol module 104 is operating normally, the refresh value is set to "0". In this way, unnecessary hello packets are not transmitted, and packet traffic in the distributed router can be reduced, and overhead generated during the process can be reduced.

At step S512, a determination is made to see whether the first routing protocol module 104 has received a hello response packet from the second routing protocol module 104. In other words, at step S512, a determination is made to see whether the arbitrary routing protocol module 104 has received a hello response packet from the adjacent routing protocol module 104.

At step S512, when the first routing protocol module 104 has not received a hello response packet from the second routing protocol module 104, then the step S514 is performed next. At step S512, when the first routing protocol module 104 has received a hello response packet from the second routing protocol module 104, then the step S516 is performed next.

At step S512, if a hello response packet has been received by the first routing protocol module 104 from the second routing protocol module 104, then this is an indication that the second routing protocol module 104 is operating normally, because such a hello response packet is sent in response to a hello packet sent from the first routing protocol module 104.

At step S514, a determination is made to see whether the first routing protocol module 104 has sent a hello response packet to the second routing protocol module 104. In other words, a determination is made to see whether the arbitrary routing protocol module 104 has sent a hello response packet to the adjacent routing protocol module 104.

At step S514, if a hello response packet has been sent from the first routing protocol module 104 to the second routing protocol module 104, then this is an indication that the second routing protocol module 104 is operating normally, because such a hello response packet is sent in response to a hello packet transmitted from the second routing protocol module 104.

At step S514, when the first routing protocol module 104 has not sent a hello response packet to the second routing protocol module 104, then the step S502 is performed next. At step S514, when the first routing protocol module 104 has sent a hello response packet to the second routing protocol module 104, then the step S516 is performed next.

As shown in FIG. 5, the determinations made at steps S512 and S514 are interchangeable, in accordance with the principles of the present invention. In other words, the determination shown to be performed at step S512 in FIG. 5 can actually be performed at step S514 instead of at step S512, if the determination made at step S514 is performed at step S512 instead of at step S514.

At step S516, the refresh variable is set to "0" and the send variable is set to "0". The refresh variable is set to "0" at step S516 to indicate that the second routing protocol module 104 is operating normally. When either one of the steps S512 and S514 are answered in the affirmative, then this is an indication that the second routing protocol module 104 is operating normally.

When the first routing protocol module 104 sends a hello response packet to the second routing protocol module 104, this is an indication that the second routing protocol module 104 has earlier sent a hello packet to the first routing protocol module 104, in accordance with the principles of the present invention.

At step S516, when the second routing protocol module 104 is operating normally, the refresh variable is set to "0". In this way, unnecessary hello packets are not transmitted, and packet traffic in the distributed router can be reduced, and overhead generated during the process can be reduced. After step S516, the step S502 is performed.

At step S504, if the refresh variable is "1", then step S520 is performed next. At step S520, a determination is made to see whether the value of the send variable is "1". The step S530 is performed if the value of the send variable is "1" at step S520. The step S522 is performed if the value of the send variable is not "1" at step S520.

At step S530, the first routing protocol module 104 concludes that the second routing protocol module 104 is malfunctioning, because no hello response packet has been received in the allotted time. At step S530, information about the malfunctioning second routing protocol module 104 is transmitted to the designate routing protocol 114 of the switch module 110.

At step S522, a hello packet is transmitted from the first routing protocol module 104 to the second routing protocol module 104. After step S522, then step S524 is performed. At step S524, the refresh variable is set to be "0". After step S524, then step S526 is performed. At step S526, the send variable is set to be "1". After step S526, then step S502 is performed again to see if the hello packet transmission cycle has expired.

With reference to FIG. 5, the first routing protocol module 104 corresponds to an arbitrary routing protocol module 104. The second routing protocol module 104 corresponds to a routing protocol module 104 that is adjacent to the arbitrary routing protocol module 104. The second routing protocol module 104 is a neighbor of the first routing protocol module 104. With reference to the method of FIG. 5, the first and second routing protocol modules 104 can be connected in series, but they do not need to be connected in series.

It is possible to utilize the method shown in FIG. 5 with more than two neighboring routing protocol modules 104. When the method of FIG. 5 is utilized with three neighboring routing protocol modules 104, for example, one of the three neighboring routing protocol modules 104 can be considered to be the arbitrary routing protocol module 104 or "first routing protocol module 104" as described above with reference to FIG. 5. Each individual one of the other two neighboring routing protocol modules 104 can be considered to be the adjacent routing protocol module 104 or "second routing protocol module 104" as described above with reference to FIG. 5.

When the method of FIG. 5 is utilized with four neighboring routing protocol modules 104, for example, one of the four neighboring routing protocol modules 104 can be considered to be the arbitrary routing protocol module 104 or "first routing protocol module 104" as described above with reference to FIG. 5. Each individual one of the other three neighboring routing protocol modules 104 can be considered to be the adjacent routing protocol module 104 or "second routing protocol module 104" as described above with reference to FIG. 5.

The method of FIG. 5 can be utilized with more than four neighboring routing protocol modules 104. With reference to the method of FIG. 5, the first and second routing protocol modules 104 can be chosen from any two routing protocol modules 104. In other words, the first and second routing protocol modules 104 do not need to be physically adjacent to each other, and the first and second routing protocol modules 104 do not need to be neighbors.

The refresh variable and the send variable can be given different names. These names are given here to clarify the present invention, not to impose any type of limitation. Also, the method can be applied to different cases, that is, to three or four routing protocol modules can be designated as neighbor, or the routing protocol modules can be connected in series.

Figure 6:
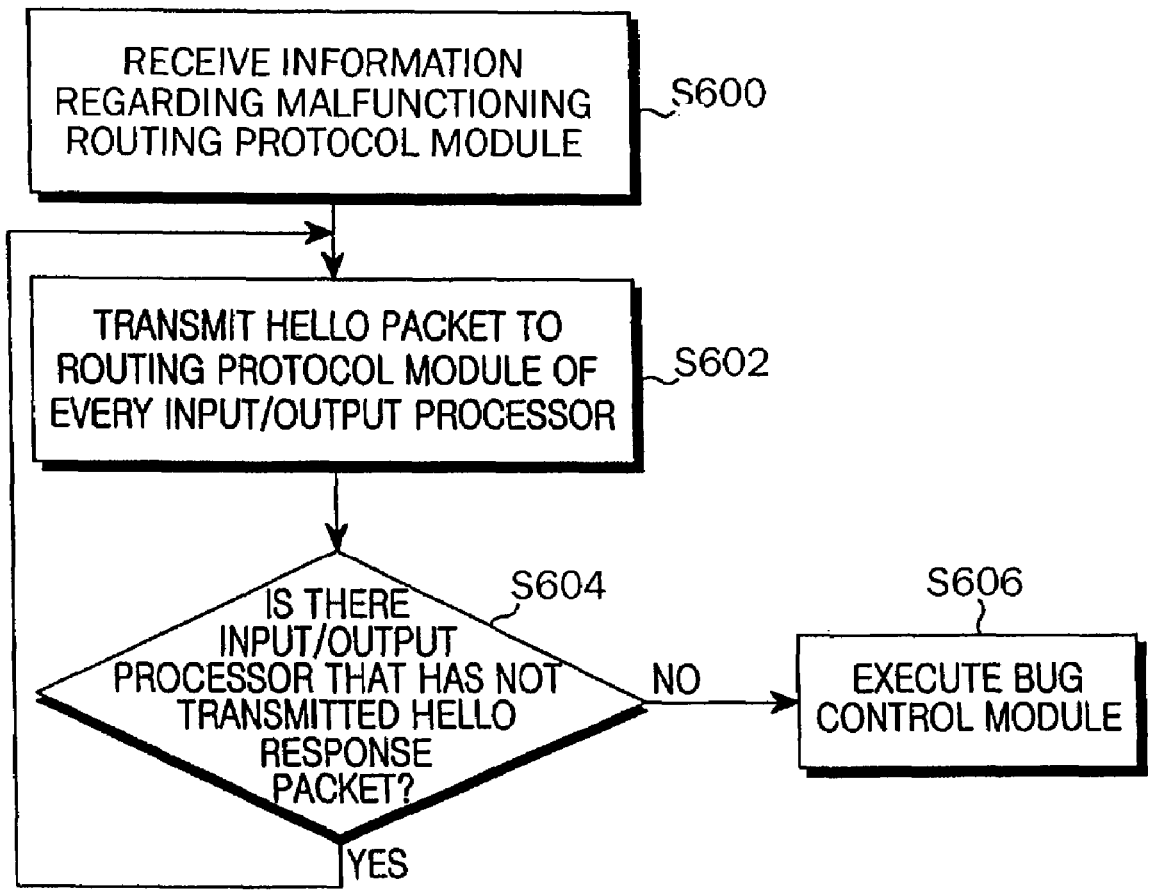
FIG. 6 is a flow chart showing an operation being performed by designate routing protocol that is in a switch module, especially when a routing protocol module in an input/output processor is malfunctioning, in accordance with the principles of the present invention.

FIG. 6 is a flow chart showing an operation being performed by designate routing protocol that is in a switch module, especially when a routing protocol module in an input/output processor is malfunctioning, in accordance with the principles of the present invention. The embodiment illustrated in FIG. 6 is most effective for a case of FIG. 4. Namely, when routing protocol modules 104 in more than three routing input/output processors 100 are malfunctioning or have errors, then the embodiment of FIG. 6 can be very effectively used.

At step S600, designate routing protocol 114 receives information on the errors and problems of the routing protocol module 104 of input/output processor 100. In other words, at step S600, designate routing protocol 114 receives information regarding the malfunctioning routing protocol module 104 of an input/output processor 100.

At step S602, the designate routing protocol 114 transmits a hello packet to routing protocol modules 104 of every input/output processor 100. Here, transmitting the hello packet can be realized by broadcasting the hello packet to the routing protocol modules 104. At step S604, it is checked if there is any input/output processor 100 that has not transmitted a hello response packet in response to the hello packet broadcast at step S602. At step S606, an error control module is executed. At step S606, the error control module helps to control malfunctions, errors and problems. When the error control module is executed in step S606, the malfunctioning routing protocol module 104 can be repaired, or use of the malfunctioning routing protocol module 104 can discontinue, for example. The error control module can be designed to perform one or many different steps. For example, the error control module can attempt to repair the malfunctioning routing protocol module 104. Such a repair can include copying or overwriting software in the router 300, and installing software, relating to the malfunctioning routing protocol module 104.

The error control module can perform an action which will prevent the distributed router 300 from utilizing the malfunctioning routing protocol module 104. The error control module can notify a technician of the fact that the malfunctioning routing protocol module 104 is malfunctioning. The error control module can perform a program that fixes errors and can notify of a generation of errors.

The error control module can control the distributed router 300 to temporarily stop the router 300 from sending hello packets to the malfunctioning routing protocol module 104. The error control module can control the distributed router 300 to temporarily discontinue communication with the malfunctioning routing protocol module 104, so that resources are not wasted on trying to communicate with a malfunctioning module 104, and so that resources are not wasted on trying to utilize a malfunctioning module 104.

The error control module can control the distributed router 300 to temporarily discontinue utilization of the malfunctioning routing protocol module 104. That is, the error control module can cause the router 300 to not use the malfunctioning routing protocol module 104 in the forwarding of packets or in other functions. The malfunctioning routing protocol module 104 can also be described as a routing protocol module 104 that is not functioning normally.

The error control module can control the distributed router 300 to cause the router 300 to send hello packets to the malfunctioning routing protocol module 104 less frequently than it sends hello packets to the other routing protocol modules 104. A timer can be implemented to cause a hello packet to be sent to the malfunctioning routing protocol module 104 only after 20 hello packets have been transmitted to the other, normally operating, routing protocol modules 104.

To summarize, the hello packet's traffic and overhead in routing protocol module 104 and designate routing protocol 114 of each input/output processor 100 can be successfully reduced by having the process involving hello packet and hello response packet for recognizing errors and problems in routing protocol module 104 of input/output processor 100 distributed to routing protocol module 104 of adjacent input/output processor 100.

The Table 1 below shows a comparison of the present invention with a different system. The different system does not operate in accordance with the principles of the present invention. The different system exhibits problems that are solved by the present invention. In the different system, a router mounted with n input/output processors 100 required $n^2$ packet traffic. However, in the present invention, only n packet traffic is required. Table 1 shows differences between the present invention and the different system in terms of effects.

TABLE 1

|  | Packet traffic (n input/output processors) | Bandwidth usage (10 input/output processors, 10 ms transmission cycle) |
| --- | --- | --- |
| Different System | n × n | 98 (bytes) × 100 × 100 = 1 M bytes/sec |
| Present Invention | n | 98 (bytes) × 100 × 10 = 1K bytes/sec |

As the Table 1 shows, the bandwidth usage of the present invention is 1/10 of that of the different system. In addition, when an input/output processor 100 is added onto the distributed router to which the present invention is applied, an adjacent input/output processor 100 and hello packet are processed. Therefore, hello packet traffic and processing overhead due to the additionally mounted input/output processor 100 do not influence the existing input/output processor 100, and as a result thereof, packet traffic and overhead are not increased.

Here is an example of a method of detecting problematical routing protocol modules or malfunctioning routing protocol modules, in accordance with the principles of the present invention: The present invention provides a method, comprising: detecting routing protocol modules that are not functioning normally in a distributed router, the distributed router including at least a first switch module having a first designate routing protocol, a first input/output processor having a first routing protocol module, and a second input/output processor having a second routing protocol module, said detecting comprising: determining when a transmission cycle expires; when the transmission cycle expires, transmitting a first hello packet; when the second routing protocol module is functioning normally, sending a first hello response packet in response to the first hello packet; when the second routing protocol module does not send the first hello response packet to the first routing protocol module in response to the first hello packet, determining that the second routing protocol module is not functioning normally and transmitting information indicating that the second routing protocol module is not functioning normally; said transmitting of the first hello packet being performed only when predetermined conditions are satisfied and the transmission cycle expires; the predetermined conditions being satisfied when a second hello packet is not received by the first routing protocol module from the second routing protocol module before the transmission cycle expires and a second hello response packet is not received by the first routing protocol module from the second routing protocol module before the transmission cycle expires; the predetermined conditions being not satisfied when at least one selected from among the second hello packet and the second hello response packet is received by the first routing protocol module from the second routing protocol module before the transmission cycle expires; when the predetermined conditions are not satisfied, determining that the second routing protocol module is functioning normally and not transmitting the first hello packet from the first routing protocol module to the second routing protocol module. In the above example, the word "first" in the description of the "first hello packet" does not necessarily mean that this hello packet has been transmitted before any other hello packets. The word "first" here is merely added to uniquely identify this hello packet. Similarly, in the above example, the word "second" in the description of the "second hello packet" does not necessarily mean that this hello packet is second in time or is transmitted second. The word "second" here is merely added to uniquely identify this hello packet. Accordingly, in view of the foregoing, the "second hello packet" could be transmitted before the "first hello packet" is transmitted, in the above example.

In conclusion, the present invention advantageously reduces packet traffic and overhead that are generated while checking for errors and problems in the distributed router. Moreover, the present invention is effective for not increasing packet traffic and overhead for checking for errors and problems in the router as additional input/output processor is being mounted thereon.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for detecting routing protocol modules that are malfunctioning in a distributed router, the distributed router including at least a first switch module having a first designate routing protocol module, a first input/output processor having a first routing protocol module, and a second input/output processor having a second routing protocol module, said method comprising the steps of:

- determining when a transmission cycle expires;
- when the transmission cycle expires, transmitting a first hello packet from the first routing protocol module to the second routing protocol module;
- when the second routing protocol module is not malfunctioning, sending a first hello response packet from the second routing protocol module to the first routing protocol module in response to the first hello packet; and
- when the second routing protocol module does not send the first hello response packet to the first routing protocol module in response to the first hello packet, determining that the second routing protocol module is malfunctioning and transmitting information to the first designate routing protocol module, the information indicating that the second routing protocol module is malfunctioning.

2. The method of claim 1, the first and second routing protocol modules being adjacent to each other.

3. The method of claim 1, further comprising:
- said transmitting of the first hello packet being performed only when predetermined conditions are satisfied and the transmission cycle expires;
- the predetermined conditions being satisfied when a second hello packet is not received by the first routing protocol module from the second routing protocol module before the transmission cycle expires and a second hello response packet is not received by the first routing protocol module from the second routing protocol module before the transmission cycle expires;
- the predetermined conditions being not satisfied when at least one selected from among the second hello packet and the second hello response packet is received by the first routing protocol module from the second routing protocol module before the transmission cycle expires; and
- when the predetermined conditions are not satisfied, determining that the second routing protocol module is not malfunctioning and not transmitting the first hello packet from the first routing protocol module to the second routing protocol module.

4. The method of claim 1, further comprising:
- receiving the information indicating that the second routing protocol module is malfunctioning; and
- when the information is received, executing an error control module to perform at least one selected from among repairing the second routing protocol module and discontinuing communication with the second routing protocol module.

5. The method of claim 4, further comprising:
- after said receiving of the information indicating that the second routing protocol module is malfunctioning, confirming that the second routing protocol module is malfunctioning by transmitting a third hello packet to the routing protocol modules of all of the input/output processors and determining whether the routing protocol modules transmit a third hello response packet in response to the third hello packet.

6. The method of claim 1, the first input/output processor including a first system processor and a first network processor, the second input/output processor including a second system processor and a second network processor.

7. A method for detecting a module that is malfunctioning in a router, said method comprising the steps of:
- in a router including at least a first input/output processor having a first routing protocol module and including a second input/output processor having a second routing protocol module, determining when a transmission cycle expires;
- when the transmission cycle expires, transmitting a first hello packet to the second routing protocol module;
- when the second routing protocol module is not malfunctioning, sending a first hello response packet from the second routing protocol module in response to the first hello packet; and
- when the second routing protocol module does not send the first hello response packet in response to the first hello packet, determining that the second routing protocol module is malfunctioning and transmitting information indicating that the second routing protocol module is malfunctioning;
- said transmitting of the first hello packet being performed only when predetermined conditions are satisfied and the transmission cycle expires;
- the predetermined conditions being satisfied when a new hello packet is not received from the second routing protocol module before the transmission cycle expires and a new hello response packet is not received from the second routing protocol module before the transmission cycle expires;
- the predetermined conditions being not satisfied when at least one selected from among the second hello packet and the second hello response packet is received from the second routing protocol module before the transmission cycle expires; and
- when the predetermined conditions are not satisfied, determining that the second routing protocol module is not malfunctioning and not transmitting the first hello packet to the second routing protocol module.

8. The method of claim 7, further comprising:
- after said transmitting of the information indicating that the second routing protocol module is malfunctioning, confirming that the second routing protocol module is malfunctioning by transmitting a broadcast hello packet to all the routing protocol modules and determining whether all the routing protocol modules transmit a hello response packet in response to the broadcast hello packet.

9. The method of claim 8, the first and second input/output processors being adjacent to each other.

10. The method of claim 9, said transmitting of the first hello packet to the second routing protocol module being performed by the first routing protocol module, said transmitting of the information being performed by the first routing protocol module.

11. The method of claim 10, the router being a distributed router including a first switch module having a first system processor and a first designate routing protocol and including a backup switch module having a backup system processor and a backup designate routing protocol, the first switch module being in communication with the first and second input/output processors, the backup switch module being in communication with the first and second input/output processors.

12. The method of claim 11, said transmitting of the information corresponding to the first routing protocol module transmitting the information to at least one selected from among the first designate routing protocol and the backup designate routing protocol.

13. A method for detecting when a routing protocol module in a router is malfunctioning in a distributed router, said detecting being performed through hello packet transmission in the distributed router, the distributed router including at least two switch modules, a first input/output processor having a first routing protocol module, and a second input/output processor having a second routing protocol module, each of the two switch modules including a designate routing protocol, said method comprising the steps of:

monitoring a timer to determine when a hello packet transmission cycle expires;

when the hello packet transmission cycle expires, transmitting a hello packet to the second routing protocol module from the first routing protocol module;

when the second routing protocol module is not malfunctioning, sending a first hello response packet from the second routing protocol module to the first routing protocol module in response to the first hello packet; and when the second routing protocol module does not send the first hello response packet in response to the first hello packet within a predetermined period of time, determining that the second routing protocol module is malfunctioning and transmitting information from the first routing protocol module to the designate routing protocol of at least one of the two switch modules, the information indicating that the second routing protocol module is malfunctioning.

14. The method of claim 13, further comprising:

said transmitting of the first hello packet being performed only when predetermined conditions are satisfied and the transmission cycle expires;

the predetermined conditions being satisfied when a second hello packet is not received by the first routing protocol module from the second routing protocol module before the transmission cycle expires and a second hello response packet is not received by the first routing protocol module from the second routing protocol module before the transmission cycle expires;

the predetermined conditions being not satisfied when at least one selected from among the second hello packet and the second hello response packet is received by the first routing protocol module from the second routing protocol module before the transmission cycle expires; and when the predetermined conditions are not satisfied, determining that the second routing protocol module is not malfunctioning and not transmitting the first hello packet from the first routing protocol module to the second routing protocol module.

15. The method of claim 14, further comprising:

receiving the information indicating that the second routing protocol module is not functioning normally; and when the information is received, executing an error control module to perform at least one selected from among repairing the second routing protocol module and discontinuing communication with the second routing protocol module.

16. The method of claim 15, further comprising:

after said receiving of the information indicating that the second routing protocol module is malfunctioning, confirming that the second routing protocol module is malfunctioning by transmitting a third hello packet to the routing protocol modules of all of the input/output processors and determining whether the routing protocol modules transmit a third hello response packet in response to the third hello packet.

17. The method of claim 16, the first input/output processor including a first system processor and a first network processor, the second input/output processor including a second system processor and a second network processor.

18. The method of claim 17, the first and second routing protocol modules being adjacent to each other.

19. The method of claim 17, the first and second input/output processors being adjacent to each other.

20. A method for checking for errors and problems in a routing protocol module in a distributed router which is mounted with a plurality of input/output processors, including the routing protocol module, and a switch module including a designate routing protocol module, the method comprising the steps of:

checking a hello packet transmission cycle in the plurality of the routing protocol modules;

transmitting a hello packet from a routing protocol module to an adjacent routing protocol module when the hello packet transmission cycle has expired;

transmitting a hello response packet from the adjacent routing protocol module to the routing protocol module when the adjacent routing protocol module is not malfunctioning;

when the adjacent routing protocol module does not send the hello response packet, concluding that the adjacent routing protocol module is malfunctioning, and transmitting, from the routing protocol module to the designate routing protocol module, information on the malfunctioning adjacent routing protocol module.

21. The method of claim 20, further comprising:

said transmitting of the hello packet being performed only when predetermined conditions are satisfied and the transmission cycle expires;

the predetermined conditions being satisfied when an additional hello packet is not received by the routing protocol module from the adjacent routing protocol module before the transmission cycle expires and an additional hello response packet is not received by the routing protocol module from the adjacent routing protocol module before the transmission cycle expires;

the predetermined conditions being not satisfied when at least one of the additional hello packet and the additional hello response packet is received by the routing protocol module from the adjacent routing protocol module before the transmission cycle expires; and when the predetermined conditions are not satisfied, determining that the adjacent routing protocol module is not malfunctioning and not transmitting the hello packet from the routing protocol module to the adjacent routing protocol module.

22. The method of claim 20, further comprising the steps of:

receiving the information indicating that the adjacent routing protocol module is malfunctioning; and when the information is received, executing an error control module to perform at least one of repairing the adjacent routing protocol module and discontinuing communication with the adjacent routing protocol module.

23. The method of claim 22, further comprising the steps of:

after said receiving of the information indicating that the adjacent routing protocol module is malfunctioning, confirming that the adjacent routing protocol module is malfunctioning by transmitting a further hello packet to the routing protocol modules of all of the input/output processors and determining whether the routing protocol modules transmit a further hello response packet in response to the further hello packet.

24. The method of claim 20, the first input/output processor including a first system processor and a first network processor, the second input/output processor including a second system processor and a second network processor.

* * * * *